United States Patent
Krychniak

(10) Patent No.: US 6,192,357 B1
(45) Date of Patent: Feb. 20, 2001

(54) METHOD AND APPARATUS FOR OPTIMIZING QUERY GENERATION BY SELECTIVELY UTILIZING ATTRIBUTES OR KEY VALUES

(75) Inventor: Piotr Jacek Krychniak, Houston, TX (US)

(73) Assignee: Platinum Technology, Inc., Islandia, NY (US)

( * ) Notice: Under 35 U.S.C. 154(b), the term of this patent shall be extended for 0 days.

(21) Appl. No.: 09/185,042

(22) Filed: Nov. 3, 1998

(51) Int. Cl.[7] ........................................... G06F 17/30
(52) U.S. Cl. ................ 707/2; 707/4; 707/5; 707/100; 707/102; 711/159
(58) Field of Search ......................... 707/1–5, 100, 707/102–104, 203, 533; 706/12, 16; 705/26; 711/159; 717/1

(56) References Cited

U.S. PATENT DOCUMENTS

| | | | |
|---|---|---|---|
| 5,359,724 | * 10/1994 | Earle ..................... | 707/205 |
| 5,428,774 | * 6/1995 | Takahashi et al. ..... | 707/101 |
| 5,440,730 | * 8/1995 | Elmasri et al. ........ | 707/203 |
| 5,551,031 | * 8/1996 | Cheng et al. .......... | 707/2 |
| 5,572,731 | * 11/1996 | Morel et al. ........... | 717/1 |
| 5,590,324 | * 12/1996 | Leung et al. .......... | 707/5 |
| 5,625,813 | * 4/1997 | Venn ..................... | 707/2 |
| 5,675,785 | * 10/1997 | Hall et al. ............. | 707/102 |
| 5,713,020 | * 1/1998 | Reiter et al. .......... | 707/102 |
| 5,745,754 | * 4/1998 | Lagarde et al. ....... | 707/104 |
| 5,745,755 | * 4/1998 | Covey ................... | 707/203 |
| 5,761,652 | * 6/1998 | Wu et al. ............... | 707/2 |
| 5,799,300 | * 8/1998 | Agrawal et al. ....... | 707/5 |
| 5,806,059 | * 9/1998 | Tsuchida et al. ...... | 707/2 |
| 5,832,475 | * 11/1998 | Agrawal et al. ....... | 707/2 |
| 5,897,622 | * 4/1999 | Blinn et al. ........... | 705/26 |
| 5,937,408 | * 8/1999 | Shoup et al. .......... | 707/102 |
| 5,974,418 | * 10/1999 | Blinn et al. ........... | 707/100 |

OTHER PUBLICATIONS

Toyama, Motomichi et al., "Hash–based symmetric data structure and join algorithm OLAP applications", IDE International Symposium Proceedings of the Database Engineering and Applications, Aug. 2–4, 1999, pp. 231–238.*

Fegaras, Leonidas et al., "A temporal Object Query Language", Proceedings of the Fifth International Workshop on Temporal Representation and Reasoning, May 16–17, 1998, pp. 51–57.* van Zyl, Julieanne et al., "Representation of metadata in a data warehouse", 1998 IEEE Region 10 International Conference on Global Connectivity in Energy, Computer, Communication and Control, Dec. 17–19, 1998, vol. 1, pp. 103–106.*

* cited by examiner

Primary Examiner—Hosain T. Alam
Assistant Examiner—Shahid Alam
(74) Attorney, Agent, or Firm—Piper Marbury Rudnick & Wolfe; William T. Rifkin

(57) ABSTRACT

A method of joining two or more sets of data in a database is provided wherein certain dimensions in the fact data are designated as being forced dimensions, and wherein for each forced dimension, a set of entries is created in the fact data each with the same key values in all of the dimensions other than the forced dimension, and each with a different member of the set of values existing in the fact data for that dimension, if and only if at least one entry exists in the fact data with the same set of key values in the dimensions other than the forced dimension.

6 Claims, 4 Drawing Sheets

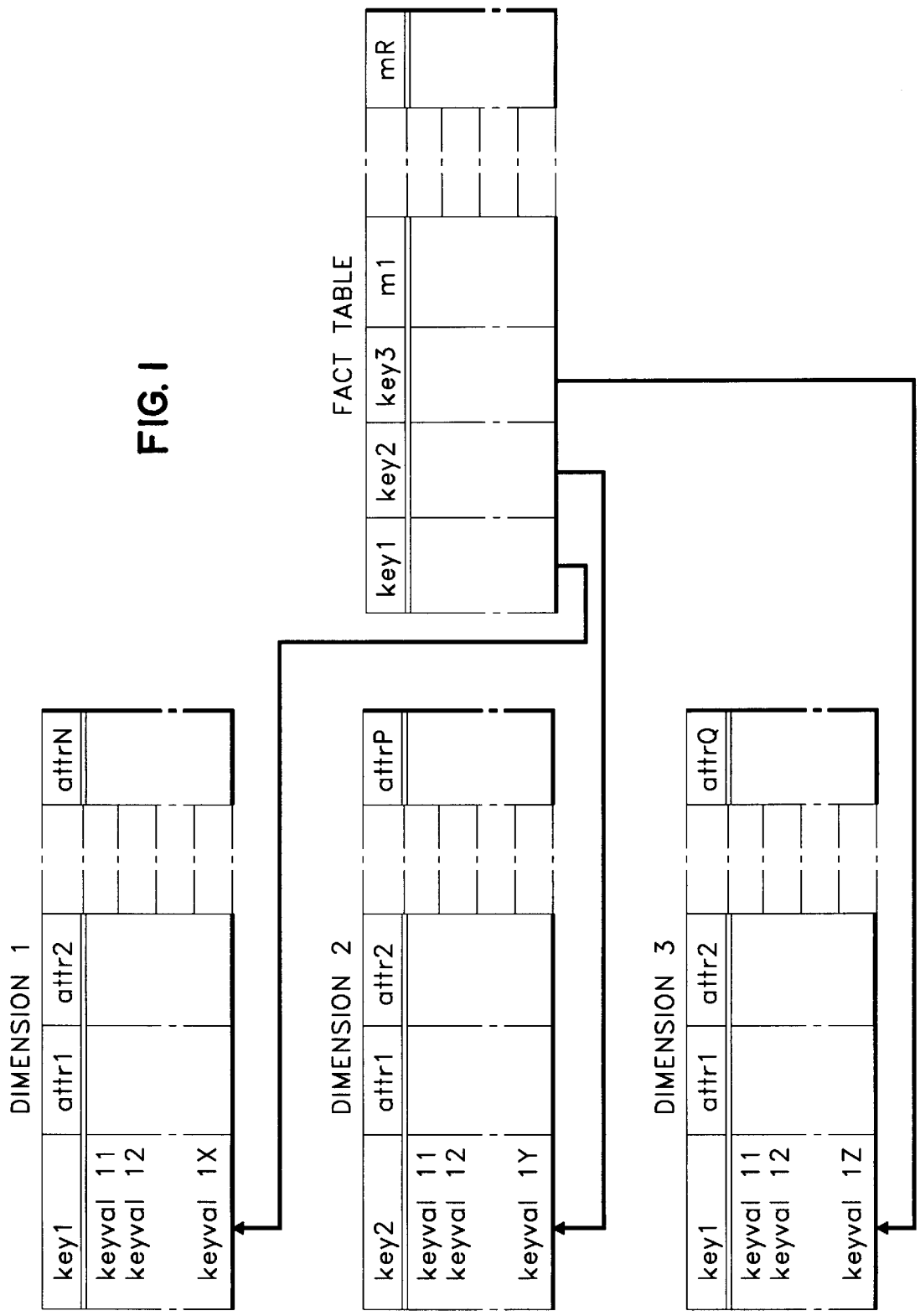

FIG 2A

| Office | City | Staff |
|---|---|---|
| A | Boston | 34 |
| B | Boston | 22 |
| C | New York | 45 |
| D | Chicago | 28 |

FIG 2B

| Month | Office | Sales |
|---|---|---|
| Jan | A | 12 |
| Jan | B | 118 |
| Jan | C | 231 |
| Feb | A | 6 |
| Feb | B | 123 |
| Feb | C | 250 |
| Feb | D | 30 |
| Mar | B | 140 |
| Mar | C | 233 |
| Mar | D | 90 |

FIG 2C

| Month | Office | Sales | City | Staff |
|---|---|---|---|---|
| Jan | A | 12 | Boston | 34 |
| Jan | B | 118 | Boston | 22 |
| Jan | C | 231 | New York | 45 |
| Feb | A | 6 | Boston | 34 |
| Feb | B | 123 | Boston | 22 |
| Feb | C | 250 | New York | 45 |
| Feb | D | 30 | Chicago | 28 |
| Mar | B | 140 | Boston | 22 |
| Mar | C | 233 | New York | 45 |
| Mar | D | 90 | Chicago | 28 |

METHOD AND APPARATUS FOR OPTIMIZING QUERY GENERATION BY SELECTIVELY UTILIZING ATTRIBUTES OR KEY VALUES

BACKGROUND OF THE INVENTION

The present invention relates to querying data in a database and more specifically to a method of selecting appropriate query parameters to efficiently perform a query.

Databases commonly store data in one or more fact tables representing instance data of some nature, along with dimension tables defining attributes for data in the fact tables. As shown in FIG. 1, the fact tables have columns which each represent an element of a particular dimension associated with the instance in question, and one or more measure columns containing data relating to that particular instance. Often, the measures will be values which can be aggregated in some way if records in the fact data are grouped together. For example, the entries might be summed or averaged. However, this might not be the case, and "measure data" in certain measure columns in the fact tables might just be an arbitrary string or other type of value which cannot be aggregated. This invention operates on any type of fact table as long as it is related to one or more dimensions with attributes.

Dimensions represent a bounded set of entities within a class, each with one or more attributes which can be classified in a common manner. A dimension is normally represented in a dimension table with one or more columns in the table uniquely indenting each entity in the dimension, known as the key value or values. Key values will often be arbitrary identifiers given to the entities in the dimension to uniquely identify them. Other columns in the table, possibly including one of the key columns, provide different attributes of each of the entities. These attribute values can be used to group the entries in the dimension table at different levels, and to extract or aggregate data from the fact tables according to their attributes.

For space efficiency, and to avoid redundancy that could lead to inconsistencies in the database, only the key values for each dimension are stored in the fact data tables. It should be noted that internal representations with a one to one correspondence with the key values in the dimension in question could be stored in the fact tables if more efficient. These would never be seen by the user. In such a case the internal representation can be considered the key value for the purposes of this discussion.

Query examples in this patent application will be given in the SQL language as this is by far the most prevalent query language used today. However, it will be apparent that the invention described herein can be implemented equally effectively with other query languages.

If a query is to be performed on the data in the database using the attribute values requested by the user, the dimension tables have to be included in the query, as in the following example:
SELECT fact.key1, fact.key2, fact.key3, fact.m1, fact.2
FROM fact, dim1, dim2, dim3
WHERE
dim1.key1=fact.key1 AND
dim2.key2=fact.key2 AND
dim3.key3=fact.key3 AND
dim1.attr1 in (attrval11, attrval12, . . . , attrval1N) AND
dim2.attr2 in (attrval21, attrval22, . . . , attrval2P) AND
dim3.attr3 in (attrval31, attrval32, . . . , attrval3Q);

In this type of query, the tables specified in the query are joined together on any common fields in each of the tables. In the above example, the key1 field is common to both the dim1 table and the fact table. The key2 field is common to both the dim2 table and the fact table. The key3 field is common to both the dim3 table and the fact table.

Using such a join, an entry is created in the output table for all combinations of entries in both of the two joined tables where the joined field is the same in each table. The joined field only appears once in the output joined table. For example, joining the two tables shown in FIGS. 2A and 2B results in the output table shown in FIG. 2C.

However, if an initial mapping of the attribute values selected in each dimension is made onto the key values in that dimension, it is not necessary to join the dimension tables with the fact table in the query, as all the necessary information is in the fact table. For example, the query might read as follows:
SELECT fact.key1, fact.key2, fact.key3, fact.m1, fact.2
FROM fact
WHERE
fact.key1 in (val11, val12, . . . , val1N) AND
fact.key2 in (val21, val22, . . . , val2P) AND
fact.key3 in (val31, val32, . . . , val3Q);

This will often be much more efficient than the equivalent attribute logic query, depending on how the database handles the query, because the dimension tables do not need to be included in the query. Furthermore, a database engine might be able to handle key values much more efficiently than attributes due to various optimizations.

Databases might be optimized for example by indexing the fact table by key value in each dimension. The appropriate fact data to include in the resultant data set can then be very quickly found by scanning through the entries for each key in the index, as the indexes associated with a particular key are arranged consecutively.

If such an index based optimizing scheme is used by the database, the following type of query will often be more advantageous to use, even when querying on key values:
SELECT fact.key1, fact.key2, fact.key3, fact.m1, fact.2
FROM fact, dim1, dim2, dim3
WHERE
dim1.key1=fact.key1 AND
dim2.key2=fact.key2 AND
dim3.key3=fact.key3 AND
fact.key1 in (val11, val12, . . . , val1N) AND
fact.key2 in (val21, val22, . . . , val2P) AND
fact.key3 in (val31, val32, . . . , val3Q);

Regardless of what query logic is used by current database querying tools, they all use the same transformations from the request into the appropriate SQL query, regardless of the number of entries which will be searched for using the query logic selected. For example, in some situations, selections made, especially at higher levels in dimensions, result in a large number of records from a dimension table matching selection criteria. For example, one might ask for all the stock funds of all the mutual funds on the market. In fact, there might be hundreds of dimension entries matching the selection criterion. If the database querying tool is automatically set up to transform the selected dimension attribute entries into key values in the fund dimension, the dimensions would be searched to find the key values matching the selection criteria. The entries in question would then be added to the query using an "IN" list, as shown above. A problem arises when the number of key values gets very large. Most database systems impose a limit on the number of values in a single "IN" list, and the query tool therefore has to split the query into a number of queries, searched for in the database. Furthermore, even if the dimensions are not indexed, it might actually take longer to perform a query with a significant number of key values using only the fact table than to perform the query using the few attribute values queried and introducing the dimensions into the query. For example, it might be almost as quick for a database engine to look up an attribute value the associated dimension table and check to see if it matches as it would to see if a key value matches. If there are significantly more key values in the equivalent query than the number of attribute values it would almost certainly be quicker to look up the attribute values in the associated dimension, than to check all the key values to see if one of them matches.

It can be seen that a query tool is required that can choose between alternative query structures depending on the actual attributes queried.

SUMMARY OF THE INVENTION

The present invention provides a method of generating queries from data requests involving attributes from one or more dimensions, wherein the corresponding key values for the attributes are ascertained, and a decision is then made as to whether to use attribute logic or key value logic in the query depending on the number of key values and attributes necessary to perform the query.

BRIEF DESCRIPTION OF THE DRAWINGS

FIG. 1 shows three generic relation tables and a corresponding fact table by way of example.

FIGS. 2A and 2B show two tables by way of example.

FIG. 2C shows a join of the two tables shown in FIGS. 2A and 2B.

DETAILED DESCRIPTION

A specific embodiment of the present invention will now be described with reference to FIGS. 3–4.

Figure 3:
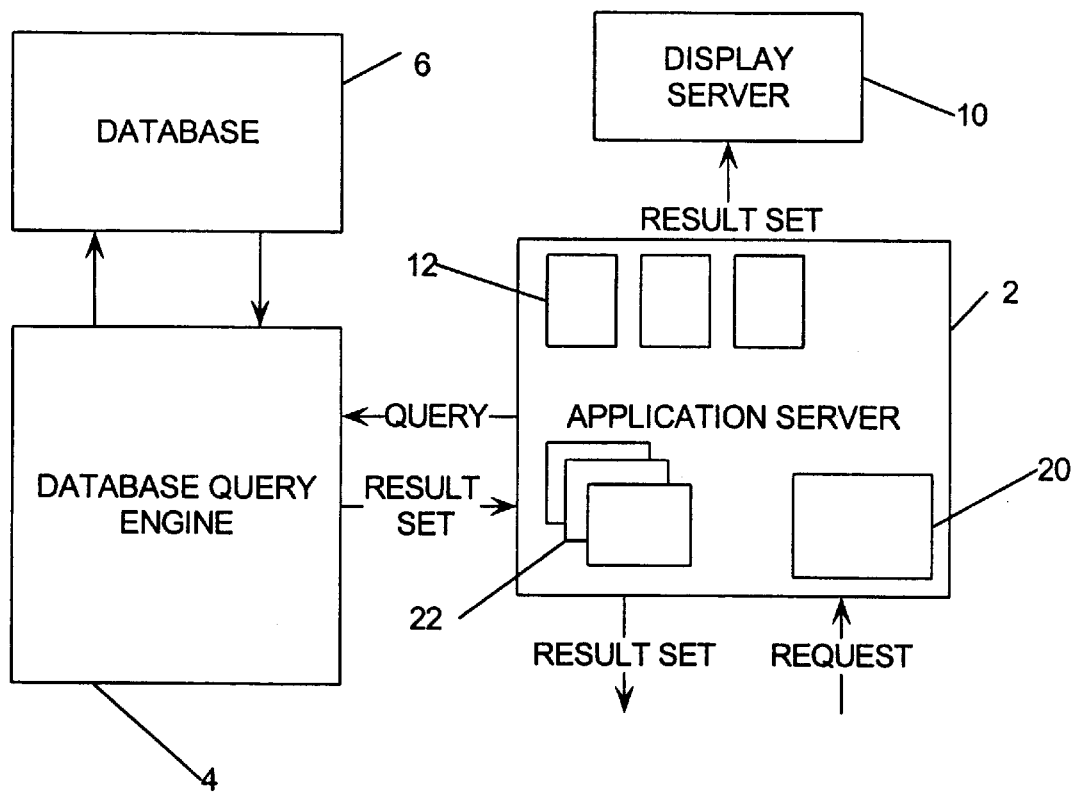
FIG. 3 shows components of a system according to a first embodiment of the invention.

As shown in FIG. 3, a query generator 20 is provided as an object on an application server 2. The query generator accepts external requests and generates SQL queries therefrom. These SQL queries are then sent to a database engine 4 which retrieves the requested data from a database 6. The returned data is then sent from the database engine back to the application server and either returned to the requester, or. processed and sent elsewhere, for example to a display server 10.

The application server also stores replicas 12 of the dimensions stored in the database relating to the fact data which is to be retrieved. When a request involving one or more attributes is received by the query generator, the query generator searches through the dimension entries and identifies all the key values required. This could also be done using queries to the database server, but would be much more inefficient.

Figure 4:
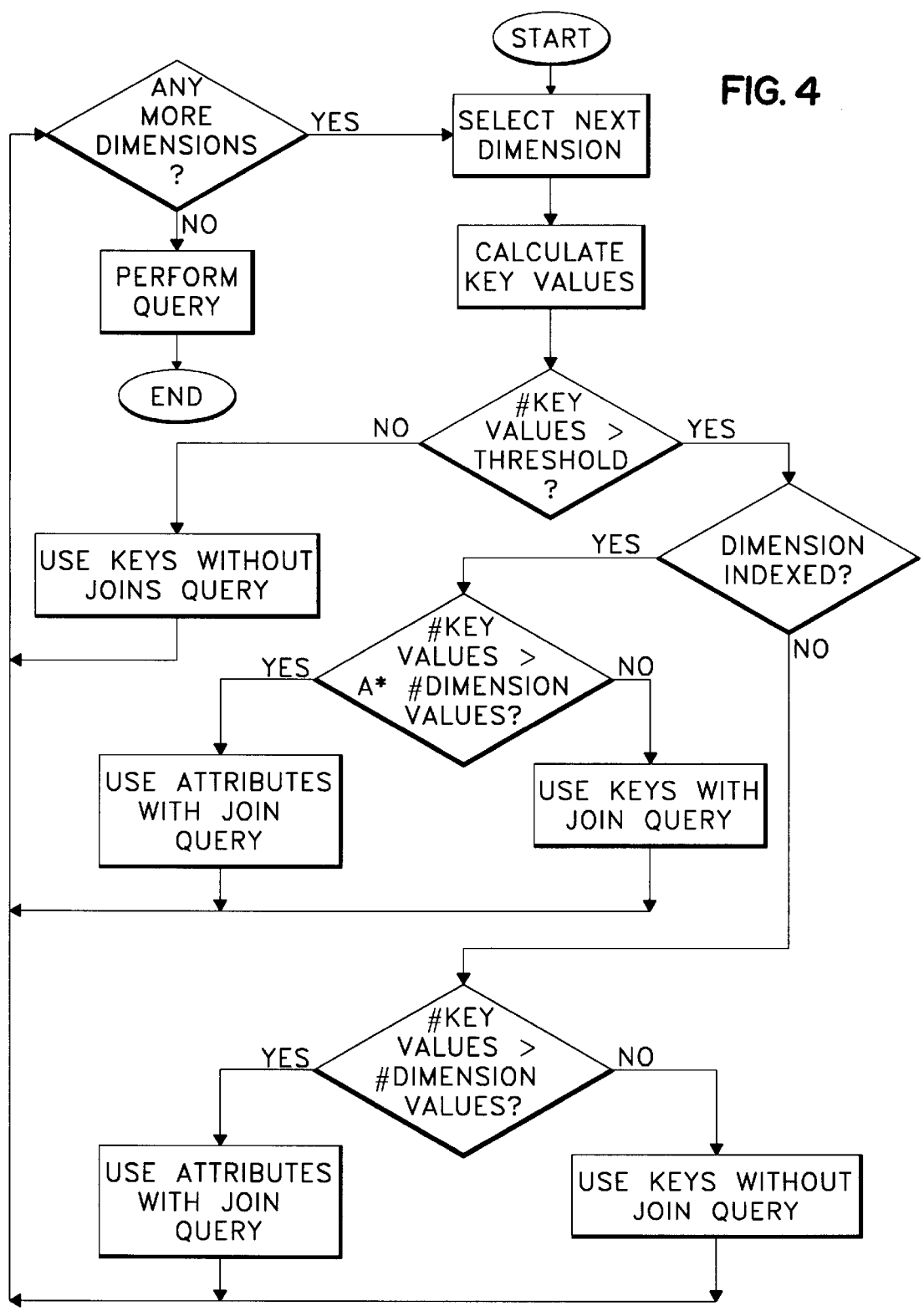
FIG. 4 is a flow diagram representing a selection algorithm according to a first embodiment of the invention.

The query generator 20 then decides how the query should be generated using the following logic, which is represented as a flowchart in FIG. 4.

For each dimension, if the number of key values is below a certain empirically determined threshold, it is deemed likely to be more efficient to simply compare the key values to the values in the fact table to obtain the results of the query. For the system on which this embodiment has been implemented by the applicants, an ideal value for this threshold was found to be 30. The query generated in this case does not include the dimensions and is simply made on the fact data (referred to as a "without" query with respect to this dimension, as the dimension is not required). For example, the following query might be generated.

SELECT fact.key1, fact.key2, fact.key3, fact.m1, fact.2
FROM fact
WHERE
fact.key1 in (val11, val12, . . . , val1N) AND . . . ;

However, if the number of keys exceeds the certain predetermined threshold, the query generated will vary depending on whether or not there is an index to the dimension for the fact table.

As discussed above, if the dimension is indexed, a key value from that dimension can very quickly be mapped onto appropriate entries in the fact table incorporating the key value.

If the dimension key is indexed, a comparison is performed to see if the number of key values which will appear in the query exceeds the number of attribute values multiplied by a certain predetermined constant A, also developed empirically. For the system on which this embodiment has been implemented by the applicants, an ideal value for this threshold was found to be 30, although it should be noted that this value is not related to the threshold value discussed above.

If the number of key values exceeds this value, attribute logic is deemed likely to be more efficient and an attribute query is generated. For example, a "with join" query including the following terms might be generated. The term "with join" refers to the fact that a join is performed between the fact table and the dimension table in question as discussed with reference to FIGS. 2A–2C. It should be noted that all attribute based queries are "with join" queries with respect to that dimension, because the attribute values cannot be ascertained without recourse to the dimension table.

SELECT fact.key1, fact.key2, fact.key3, fact.m1, fact.2
FROM fact, dim1
WHERE
dim1.key1=fact.key1 AND
dim1.attr1 in (attrval11, attrval12, . . . , attrval1N);

However, if the number of key values does not exceed the number of attribute values multiplied by the constant A, a key value based "with join" query is generated including the dimension in the query, using the optimized indexing of the database engine. The query might include the following terms:

SELECT fact.key1, fact.key2, fact.key3, fact.m1, fact.2
FROM fact, dim1
WHERE
dim1.key1=fact.key1 AND
fact.key1 in (val11, val12, . . . , val1N) AND . . . ;

If the dimension in question is not indexed, there will be less of an advantage using the key values, if any advantage at all. For example, it might be almost as quick for a database engine to look up an attribute value in the associated dimension table and check to see if it matches, as it would to see if a key value matches. Therefore, in this case, a simple comparison of the number of key values to the number of attribute values is made, rather than going to the lengths of establishing an empirical coefficient. However, such a coefficient could be used if appropriate, depending on the database engine.

If the number of key values is greater than the number of attribute values which would be used in the query for that dimension, an attribute "with join" query is used for that dimension in the query. Otherwise, a keys "without join" query is used for that dimension, as there is no advantage to including the dimension in the search because it is not indexed.

This selection algorithm is repeated for every dimension, and the query is then generated appropriately and forwarded to the database query engine.

Of course, depending on the different properties of the query in each of the dimensions, different joins might be made in each dimension. Some dimensions might be included in the query, and others not. Furthermore, some of the dimensions might include attribute logic and others not. For example, the following complete query might be generated, with the first dimension and third dimensions being included in the query, the first using key value logic, and the second using attribute value logic:

SELECT fact.key1, fact.key2, fact.key3, fact.m1, fact.2
FROM fact, dim1, dim3
WHERE
dim1.key1=fact.key1 AND
dim3.key3=fact.key3 AND
dim1.key1in (val11, val12, . . . , val1N) AND . . . ;
fact.key2 in (val21, val22, . . . , val12P) AND . . . ;
dim2.attr3 in (attrval31, attrval32, . . . , attrval3Q);

Certain requests are more complex than the cases described thus far. For example, "multiple keeps" requests occur when a user makes multiple separate selections ("keeps") from a dimension. The query generated in this case needs to use OR logic in the where clause to model this situation. For example, assume that a user made multiple "keeps" when selecting from dimension dim1. The first keep involved attributes attr1 and attr2 while the second keep involved attributes attr3 and attr4. The generated query should be as follows:

```
SELECT fact.key1, fact.key2, fact.key3, fact.m1, fact.m2, fact.m3
FROM fact, dim1WHEREdim1.key1 = fact.key1AND
(    (dim1.attr1 in (attrval11, ..attrval1N) AND
     dim1.attr2 in (attrval21, ..attrval2N))
OR
    (dim1.attr3 in (attrval31, ..., attrval3N) AND
     dim1.attr4 in (attrval41, ..., attrval4N))
)
AND fact.key2 in (val21, val22, ..., val2N)
AND fact.key3 in (val31, val32, ..., val3N)
```

According to this embodiment, with queries of this kind, each attribute referenced in the attribute based query is counted as an attribute in the above algorithm. The equivalent query using key values will be of the same format described earlier, with a simple "IN" list, and there is therefore no added complexity to establishing the number of key values.

A yet more complex scenario occurs when the user selects a measure that involve a "base" calculation (i.e. "sth" like share). This typically calls for a "behind the scenes" additional selection(s) from the given dimension. The keys logic resolves this situation by additional key values in the list of keys for the dimension. The attribute logic needs to perform an additional OR on top of the syntax related to the multiple "keeps". Let's assume that (on top of the multiple "keeps" from the example above) the user selects a "base" calculation that calls for additional selection in dimension dim1, let say from attribute attr5. The query will look as follows:

```
SELECT fact.key1, fact.key2, fact.key3, fact.m1, fact.m2, fact.m3
FROM fact, dim1
WHERE
dim1.key1 = fact.key1
AND
(   (
        (dim1.attr1 in (attrval11, ..attrval1N) AND
        dim1.attr2 in (attrval21, .. attrval2N))
    OR
        (dim1.attr3 in (attrval31, ..., attrval3N) AND
        dim1.attr4 in (attrval41, ..., attrval4N))
    )
OR
    dim1.attr5 in (attrva51, ..., attrval5N)
)
AND fact.key2 in (val21, val22, ..., val2N)
```

Such a situation is dealt with in a similar manner to the "multiple keeps" scenario.

It should be noted that a star join option can be used in conjunction with the attributes logic option, with some dimensions using a star join based on an indexed dimension, and some dimensions using the standard attribute logic. Assuming that a simple case of attribute logic is used for dimension dim1, the query might look as follows:

```
SELECT fact.key 1, fact.key2, fact.key3, fact.m1, fact.m2, fact.m3
FROM fact; dim1, dim2, dim3
WHERE
dim1.key1 = fact.key1
AND dim2.key2 = fact.key2
AND dim3.key3 = fact.key3
AND
(dim1.attr1 in (attrval11, ..attrval1N)
AND dim1.attr2 in (attrval21, .. attrval2N)
........
AND dim1.attrN in (attrvalN1, ... attrvalNN)
)
AND dim2.key2 in (val21, val22, ..., val2N)
AND dim3.key3 in (val31, val32, ..., val3N)
```

In the system of this embodiment, User profiles allow to subset the data returned to the user. The user will have access to only those records the user is privileged to see. Base uses a filtering mechanism to accomplish that. From the point of view of the attribute logic, the user profile is a set of dimension selections that determine the subset of data the user can access. Assuming that the user profile for dimension dim1 defines that the user can access only those records where the values of attribute attrK are in the given list of values, the query generated by the attribute logic might look as follows:

```
SELECT fact.key1, fact.key2, fact.key3, fact.m1, fact.m2, fact.m3
FROM fact, dim1
WHEREdim1.key1 = fact.key1
AND (
    dim1.attr1 in (attrval11, ..attrval1N)
    AND dim1.attr2 in (attrval21, .. attrval2N)
    AND dim1.attrK in (attrvalK1, ..., attrvalKN)
)
AND fact.key2 in (val21; val22, ..., val2N)
AND fact.key3 in (val31, val32, ..., val3N)
```

Each attribute value mentioned is treated as a single attribute value in the algorithm of this embodiment of the invention.

The attribute logic is not impacted by partitioned fact sets. In the case of physical partitions, each partition is defined using an aggregate table. Typically, a query is issued against each partition using the logic described.

While preferred embodiments of the present invention have been illustrated and described, it will be understood by those of ordinary skill in the art that changes and modifications can be made without departure from the invention in its broader aspects. Various features of the present invention are set forth in the following claims.

What is claimed is:

1. A method of generating a query to be used to obtain data from a database, said database comprising fact tables and at least one dimension table, each dimension table providing data representing a dimension, said data comprising attribute values in a set of attributes for a set of entities, each entity being identified by a key value, said fact tables comprising data entries, each data entry being associated with an entity from each of said dimensions; said query being based on a request for data specifying one or more of said attribute values from one or more of said dimensions; for each dimension, said method comprising the steps of:

establishing all the key values in said dimension associated with said specified attribute values in said dimension;

selecting whether to query on key value or attribute value in that dimension as a function of the number of said established key values and the number of said specified attribute values in said dimension;

generating the parts of said query corresponding to that dimension using attribute values if an attribute query is selected; and generating the parts of said query corresponding to that dimension using key values if a key value is selected.

2. A method in accordance with claim 1 wherein said step of selecting whether to query on key value or attribute value comprises the step of comparing the number of said established key values to a threshold value and, if the number of established key values is less than a predetermined value, implementing the part of the query corresponding to that dimension using a key value query on the fact data table.

3. A method in accordance with claim 2 wherein, if the number of established key values in said dimension is greater than said predetermined threshold, the part of the query corresponding to the dimension is implemented using attribute values if the ratio of established key values to specified attribute values necessary to implement said query is below a certain ratio value, and using key values if said ratio is above said ratio value.

4. A method in accordance with claim 3 wherein said ratio value varies depending on whether the dimension is indexed.

5. A method according to claim 3 wherein, if said part of said query is implemented using key values, said part of said query isilemented using only the fact data table if said dimension is not indexed, and said query is implemented by joining the fact data table with the corresponding dimension table and querying against the dimension key in said joined dimension table if said dimension is indexed.

6. Apparatus for generating a query to obtain data from a database, said database comprising fact tables and at least one dimension table, each dimension table providing data representing a dimension, said data comprising attribute values in a set of attributes for a set of entities, each entity being identified by a key value, said fact tables comprising data entries, each data entry being associated with an entity from each of said dimensions; said query being based on a request for data specifying one or more of said attribute values from one or more of said dimensions; said apparatus comprising:

means for establishing all the key values in each dimension associated with said specified attribute values in said dimension;

means for selecting whether to query on key value or attribute value in that dimension as a function of the number of said established key values and the number of said specified attribute values in said dimension;

means for generating the parts of said query corresponding to that dimension using attribute values if an attribute value query is selected; and means for generating the parts of said query corresponding to that dimension using key values if a key value query is selected.

* * * * *